(12) United States Patent
Lin

(10) Patent No.: US 10,824,022 B2
(45) Date of Patent: Nov. 3, 2020

(54) LIQUID CRYSTAL LENS AND MANUFACTURING METHOD THEREOF

(71) Applicant: LIQXTAL TECHNOLOGY INC., Tainan (TW)

(72) Inventor: Chih-Chan Lin, Tainan (TW)

(73) Assignee: LIQXTAL TECHNOLOGY INC., Tainan (TW)

( * ) Notice: Subject to any disclaimer, the term of this patent is extended or adjusted under 35 U.S.C. 154(b) by 0 days.

(21) Appl. No.: 15/726,396

(22) Filed: Oct. 6, 2017

(65) Prior Publication Data
US 2018/0348564 A1 Dec. 6, 2018

Related U.S. Application Data

(60) Provisional application No. 62/515,561, filed on Jun. 6, 2017.

(51) Int. Cl.
*G02F 1/1339* (2006.01)
*G02F 1/1341* (2006.01)
(Continued)

(52) U.S. Cl.
CPC ........ *G02F 1/13394* (2013.01); *G02F 1/1341* (2013.01); *G02F 1/133305* (2013.01);
(Continued)

(58) Field of Classification Search
CPC ............... G02F 1/13394; G02F 1/1341; G02F 1/133305; G02F 2001/133302;
(Continued)

(56) References Cited

U.S. PATENT DOCUMENTS

| | | | | |
|---|---|---|---|---|
| 4,744,639 A | * | 5/1988 | Tsuboyama ....... | G02F 1/133711 349/122 |
| 5,956,112 A | * | 9/1999 | Fujimori .......... | G02F 1/133305 349/156 |

(Continued)

FOREIGN PATENT DOCUMENTS

| JP | S58028719 | 2/1983 |
|---|---|---|
| JP | 2001296530 | 10/2001 |

(Continued)

OTHER PUBLICATIONS

"Office Action of Taiwan Counterpart Application," dated Mar. 5, 2019, p. 1-p. 10.

(Continued)

*Primary Examiner* — Angela K Davison
(74) *Attorney, Agent, or Firm* — JCIPRNET

(57) ABSTRACT

A liquid crystal cell including a first substrate, a second substrate, a liquid crystal layer and a plurality of first support pillars is provided. The first substrate has a first surface and a second surface opposite to the first surface. The second substrate is disposed beside the first substrate and has a third surface and a fourth surface opposite to the third surface. The first surface of the first substrate and the third surface of the second substrate face each other. The liquid crystal layer is disposed between the first substrate and the second substrate. The plurality of first support pillars are configured to form a cell gap of the liquid crystal cell and disposed on the first surface of the first substrate, wherein the first substrate and the plurality of first support pillars are integrally formed and made of a same material.

5 Claims, 14 Drawing Sheets

(51) Int. Cl.
*G02F 1/1333* (2006.01)
*G02F 1/29* (2006.01)

(52) U.S. Cl.
CPC ...... *G02F 1/29* (2013.01); *G02F 2001/13396* (2013.01); *G02F 2001/13398* (2013.01); *G02F 2001/133302* (2013.01); *G02F 2001/294* (2013.01)

(58) Field of Classification Search
CPC . G02F 2001/13396; G02F 2001/13398; G02F 2201/56; G02F 1/133377; G02F 2201/16; G09G 2300/023
See application file for complete search history.

(56) References Cited

U.S. PATENT DOCUMENTS 6,801,290 B2* 10/2004 Kim ................... G02F 1/13394
349/155
2002/0135720 A1* 9/2002 Yamanaka .......... G02F 1/13394
349/122
2008/0111771 A1* 5/2008 Miller ...................... G09G 3/30
345/76
2012/0202049 A1 8/2012 Valladeau et al.
2018/0101037 A1* 4/2018 Feuillade ............ G02F 1/13473

FOREIGN PATENT DOCUMENTS

TW 218412 1/1994
TW M511620 11/2015

OTHER PUBLICATIONS

"Office Action of Taiwan Counterpart Application," dated Dec. 7, 2018, p. 1-p. 8.

* cited by examiner

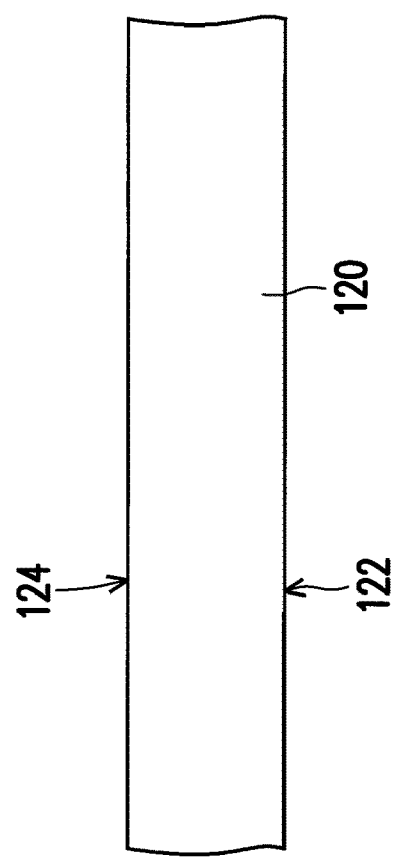
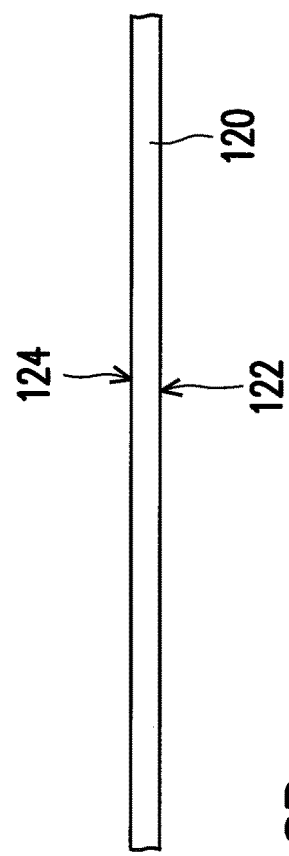
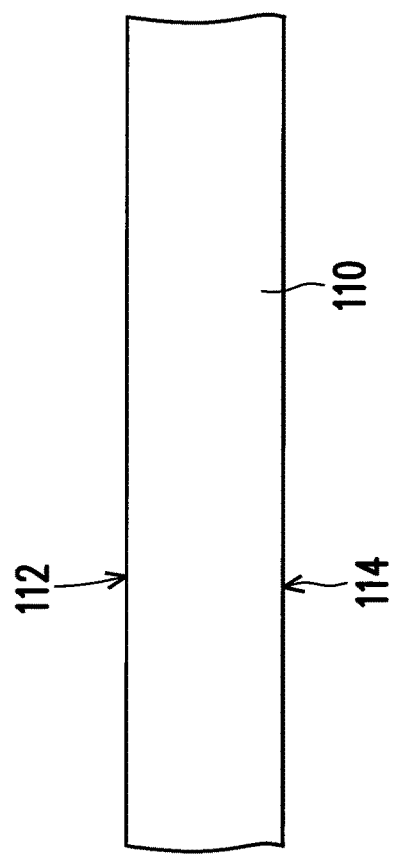
FIG. 8A
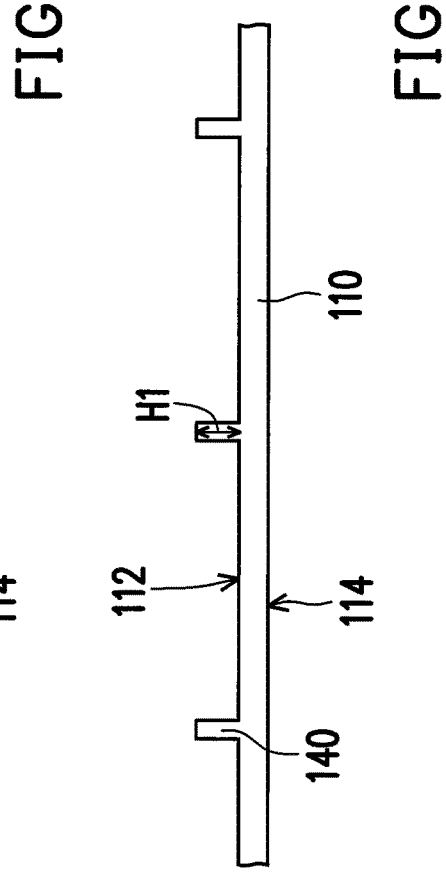
FIG. 8B
FIG. 8C

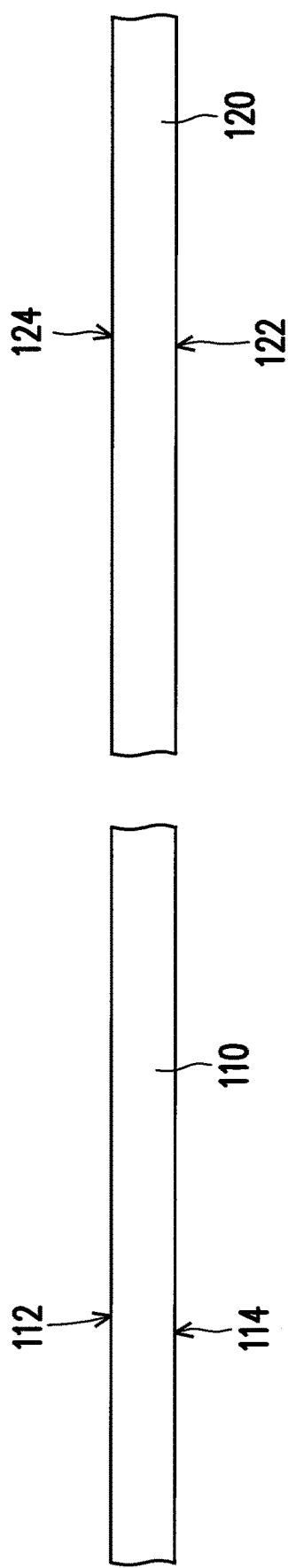
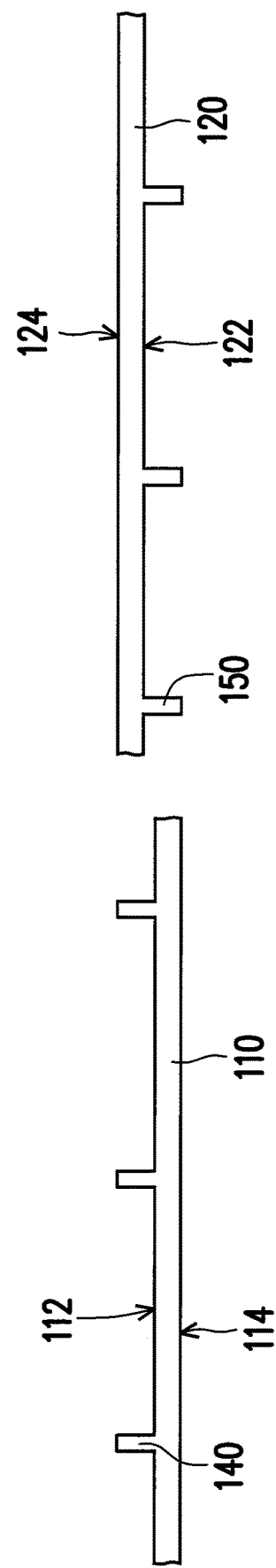
FIG. 9A
FIG. 9B

LIQUID CRYSTAL LENS AND MANUFACTURING METHOD THEREOF

CROSS-REFERENCE TO RELATED APPLICATION

This application claims the priority benefit of U.S. provisional application Ser. No. 62/515,561, filed on Jun. 6, 2017. The entirety of the above-mentioned patent application is hereby incorporated by reference herein and made a part of this specification.

BACKGROUND OF THE INVENTION

1. Field of the Invention

The invention generally relates an optical element and a manufacturing method thereof, and, in particular, to a liquid crystal cell and a manufacturing method thereof.

2. Description of Related Art

A liquid crystal lens is commonly used as an electrically tunable lens since the liquid crystal cell can function as a lens by controlling the orientations of liquid crystals to change the effective refractive powers thereof. Uniform cell gap of the liquid crystal cell can make the optical properties of the liquid crystals stable and can prevent abnormal colors and optical aberration. In general, in order to achieve uniform cell gap, photoresist is used to form pillars with the specific height and density as the spacers of the liquid crystal cell, which is a common design for the process of liquid crystal displays. However, due to the consideration for the optical requirement, the cell gap of the liquid crystal lens is much larger than one of the liquid crystal display. As a result, the cell gap of the liquid crystal lens is too large to form the spacers made of the photoresist.

SUMMARY OF THE INVENTION

The invention provides a liquid crystal cell capable of maintaining a stable cell gap.

The invention provides a manufacturing method of a liquid crystal cell, which is capable of manufacturing a liquid crystal cell that can maintain a stable cell gap.

According to an embodiment of the invention, a liquid crystal cell including a first substrate, a second substrate, a liquid crystal layer and a plurality of first support pillars is provided. The first substrate has a first surface and a second surface. The second surface is opposite to the first surface. The second substrate is disposed beside the first substrate and has a third surface and a fourth surface. The forth surface is opposite to the third surface. The first surface of the first substrate and the third surface of the second substrate face each other. The liquid crystal layer is disposed between the first substrate and the second substrate. The plurality of first support pillars are configured to form a cell gap of the liquid crystal cell and disposed on the first surface of the first substrate, wherein the first substrate and the plurality of first support pillars are integrally formed and made of a same material.

According to an embodiment of the invention, a manufacturing method of a liquid crystal cell includes providing a first substrate having a first surface and a second surface opposite to the first substrate; providing a second substrate having a third surface and a fourth surface opposite to the third substrate; etching the first surface of the first substrate to form a plurality of first support pillars; filling liquid crystals into a gap between the first substrate and the second substrate to form a liquid crystal layer; and bonding the first substrate and the second substrate and causing the first surface of the first substrate and the third surface of the second substrate to face each other.

Based on the above, by etching the first substrate, the plurality of first support pillars with specific height are easily formed as the spacers of the liquid crystal cell. Since the plurality of first support pillars and the first substrate are integrally formed and made of the same material, the plurality of first support pillars are firm enough to resist the following high-temperature processes or external force applied and have relatively minor influences on the optical performance. In addition, the problems of insufficient adhesive strength between two materials, inadequate supporting strength of the spacers, and pollution of the liquid crystals due to contact with the spacers can be solved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 8A to FIG. 8D are cross-sectional views illustrating a manufacturing process for a liquid crystal cell according to an embodiment of the invention.

FIG. 9A to FIG. 9E are cross-sectional views illustrating manufacturing processes for a liquid crystal cell according to other embodiments of the invention.

DESCRIPTION OF THE EMBODIMENTS

Figure 1A:
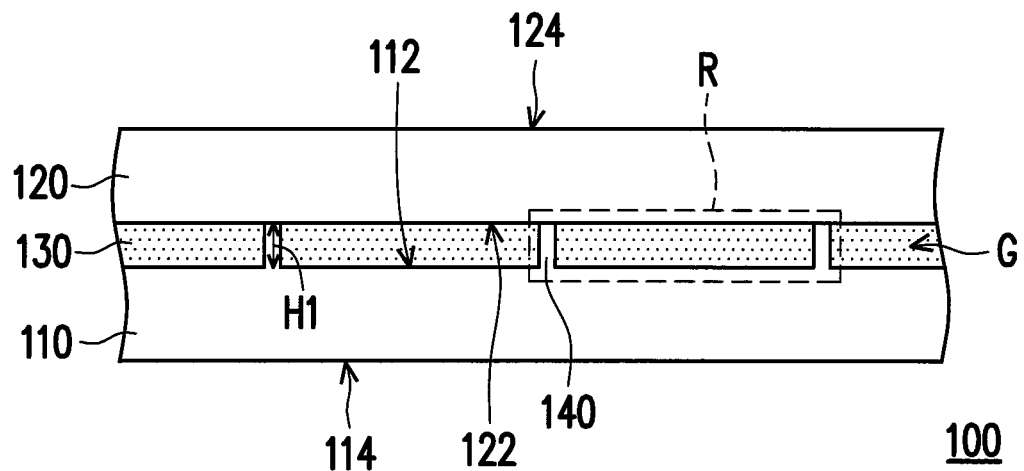
FIG. 1A is a schematic cross-sectional view of a liquid crystal cell according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1A is a schematic cross-sectional view of a liquid crystal cell according to an embodiment of the invention. Referring to FIG. 1A, a liquid crystal cell 100 of the present embodiment includes a first substrate 110, a second substrate 120, a liquid crystal layer 130 and a plurality of first support pillars 140. The first substrate 110 has a first surface 112 and a second surface 114. The second surface 114 is opposite to the first surface 112. The second substrate 120 is disposed beside the first substrate 110 and has a third surface 122 and a fourth surface 124. The forth surface 124 is opposite to the third surface 122. The first surface 112 of the first substrate 110 and the third surface 122 of the second substrate 120 face each other. The liquid crystal layer 130 is disposed between the first substrate 110 and the second substrate 120. The plurality of first support pillars 140 are configured to form a cell gap G of the liquid crystal cell 100 and disposed on the first surface 112 of the first substrate 110, wherein the first substrate 110 and the plurality of first support pillars 140 are integrally formed and made of a same material. In the present embodiment, the materials of the first substrate 110 and second substrate 120 may include glass, polyimide (PI), polystyrene (PS), polypropylene (PP), or silicon, for example. The liquid crystal cell 100 may be a liquid crystal display, a liquid crystal lens, or a liquid crystal filter.

Since the plurality of first support pillars 140 and the first substrate 110 are integrally formed and made of the same material, the plurality of first support pillars 140 are firm enough to resist the following high-temperature processes or external force applied and have relatively minor influences on the optical performance. In addition, the problems of insufficient adhesive strength between two materials, inadequate supporting strength of the spacers, and pollution of the liquid crystals due to contact with the spacers can be solved.

In the present embodiment, a height H1 of the plurality of first support pillars 140 ranges from 2 μm to 50 μm. For the liquid crystal display, the height H1 of the plurality of first support pillars 140 may range from 2 μm to 5 μm, for example. For the liquid crystal lens, the height H1 of the plurality of first support pillars 140 may range from 10 μm to 50 μm, for example. For the liquid crystal filter, the height H1 of the plurality of first support pillars 140 may range from 3 μm to 5 μm, for example.

Figure 1B:
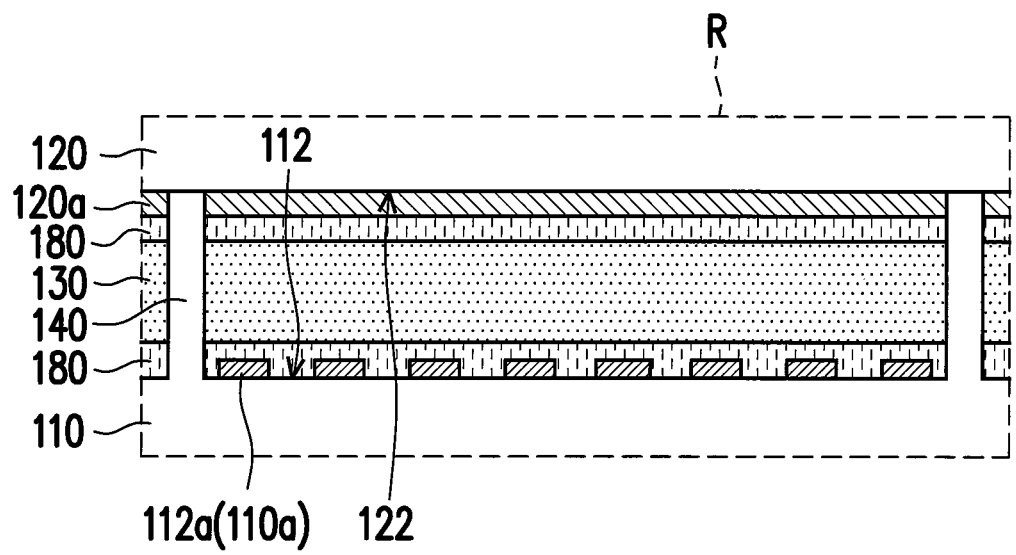
FIG. 1B is a schematic partial enlarged view corresponding to a region R of FIG. 1A.

FIG. 1B is a schematic partial enlarged view corresponding to a region R of FIG. 1A. Referring to FIG. 1B, the liquid crystal cell 100 of the present embodiment further includes a first electrode layer 110a, a second electrode layer 120a, and two alignment layers 180. The first electrode layer 110a is disposed on the first surface 112 of the first substrate 110. The second electrode layer 120a is disposed on the third surface 122 of the second substrate 120. One of the alignment layers 180 is disposed between the first electrode layer 110a and the liquid crystal layer 130. The other alignment layer 180 is disposed between the second electrode layer 120a and the liquid crystal layer 130. In the present embodiment, the first electrode layer 110a includes a plurality of first electrodes 112a which are discrete to each other, and the second electrode layer 120a includes a common electrode. In other embodiments (not illustrated), the first electrode layer 110a can include a common electrode, and the second electrode layer 120a can include a plurality of first electrodes which are discrete to each other.

Figure 2:
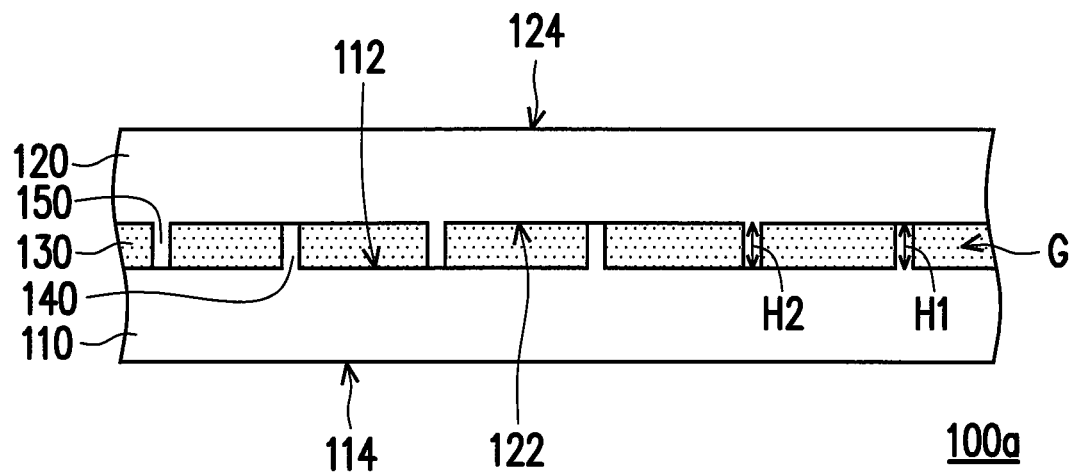
FIG. 2 is a schematic cross-sectional view of a liquid crystal cell according to an embodiment of the invention.
Figure 3:
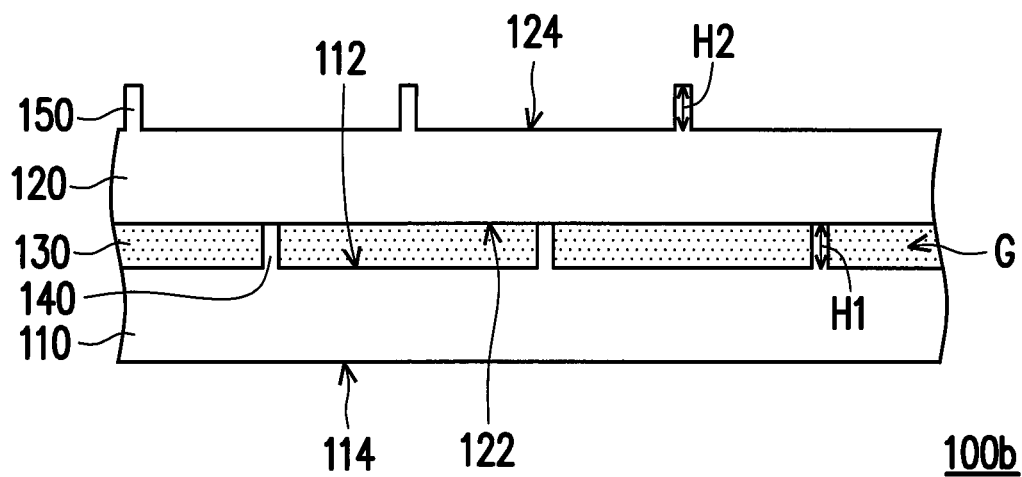
FIG. 3 is a schematic cross-sectional view of a liquid crystal cell according to another embodiment of the invention.

FIG. 2 is a schematic cross-sectional view of a liquid crystal cell according to an embodiment of the invention. FIG. 3 is a schematic cross-sectional view of a liquid crystal cell according to another embodiment of the invention. Referring to FIG. 2 and FIG. 3, a liquid crystal cell 100a and a liquid crystal cell 100b of those embodiments are substantially similar to the liquid crystal cell 100, and the differences therebetween are as follows. The liquid crystal cell 100a and the liquid crystal cell 100b further include a plurality of second support pillars 150 disposed on one of the third surface 122 and the fourth surface 124 of the second substrate 120, wherein the second substrate 120 and the plurality of second support pillars 150 are integrally formed and made of a same material. As illustrated in FIG. 2, the plurality of second support pillars 150 are disposed on the third surface 122 of the second substrate 120. As illustrated in FIG. 3, the plurality of second support pillars 150 are disposed on the forth surface 124 of the second substrate 120. In the embodiment as illustrated in FIG. 2, since the plurality of first support pillars 140 and the plurality of second support pillars 150 are disposed on the first surface 112 of the first substrate 110 and the third surface 122 of the second substrate 120, respectively, the ability of controlling the cell gap is more precise.

In the present embodiments, the height H1 of the plurality of the first support pillars 140 and a height H2 of the plurality of the second support pillars 150 can be the same. In other embodiments of the invention, the height H1 of the plurality of the first support pillars 140 and the height H2 of the plurality of the second support pillars 150 can be different.

Figure 4:
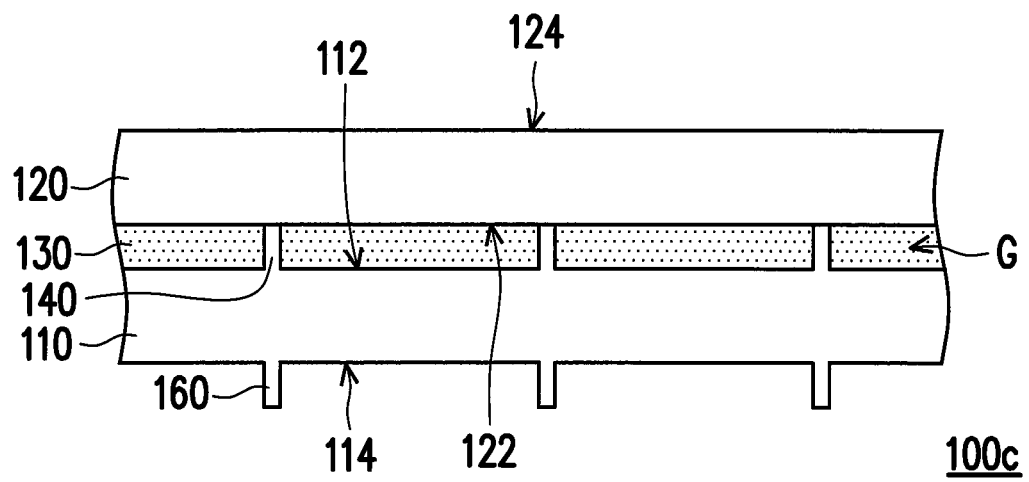
FIG. 4 is a schematic cross-sectional view of a liquid crystal cell according to an embodiment of the invention.

FIG. 4 is a schematic cross-sectional view of a liquid crystal cell according to an embodiment of the invention. Referring to FIG. 4, a liquid crystal cell 100c of the present embodiment is substantially similar to the liquid crystal cell 100, and the difference therebetween is as follows. The liquid crystal cell 100c further includes a plurality of second support pillars 160 disposed on the second surface 114 of the first substrate 110, wherein the first substrate 110 and the plurality of second support pillars 160 are integrally formed and made of a same material.

Figure 5:
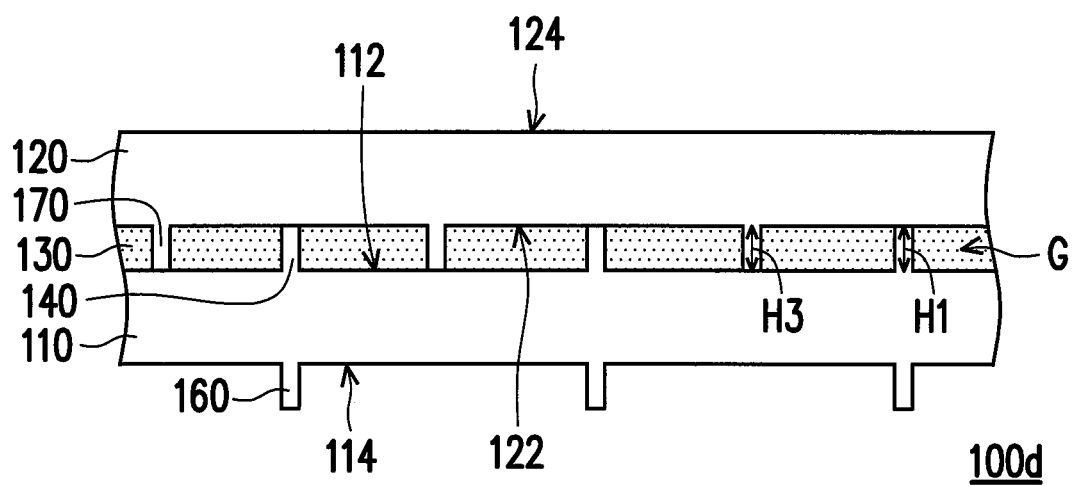
FIG. 5, FIG. 6, and FIG. 7 are schematic cross-sectional views of liquid crystal cells according to other embodiments of the invention.
Figure 6:
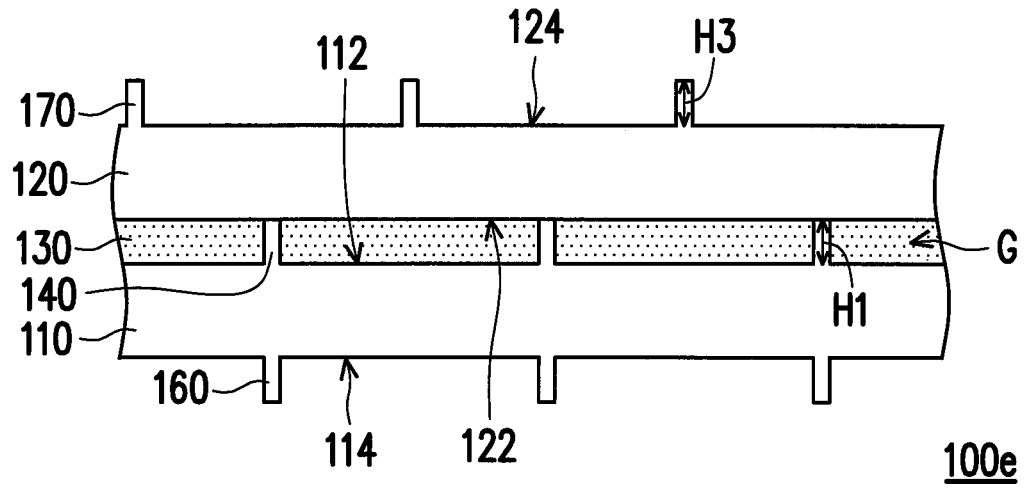
Figure 7:
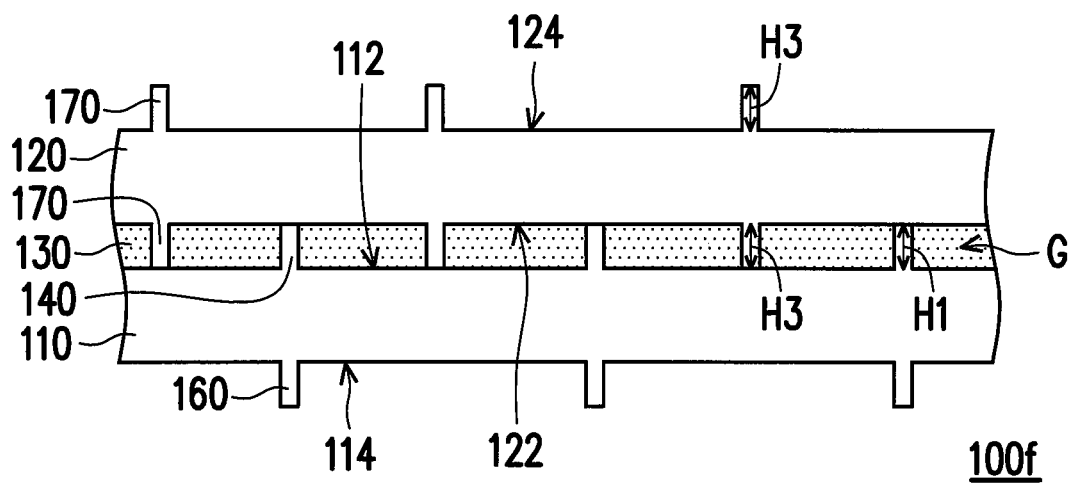

FIG. 5, FIG. 6, and FIG. 7 are schematic cross-sectional views of liquid crystal cells according to other embodiments of the invention. Referring to FIG. 5, FIG. 6, and FIG. 7, a liquid crystal cell 100d, a liquid crystal cell 100e, and a liquid crystal cell 100f of the present embodiments are substantially similar to the liquid crystal cell 100c, and the differences therebetween are as follows. The liquid crystal cell 100d, the liquid crystal cell 100e, and the liquid crystal cell 100f further include a plurality of third support pillars 170 disposed on at least one of the third surface 122 and the fourth surface 124 of the second substrate 120, wherein the second substrate 120 and the plurality of third support pillars 170 are integrally formed and made of a same material. As illustrated in FIG. 5, the plurality of third support pillars 170 are disposed on the third surface 122 of the second substrate 120. As illustrated in FIG. 6, the plurality of third support pillars 170 are disposed on the fourth surface 124 of the second substrate 120. As illustrated in FIG. 7, the plurality of third support pillars 170 are disposed on both of the third surface 122 and the fourth surface 124 of the second substrate 120.

In the present embodiments, the height H1 of the plurality of the first support pillars 140 and a height H3 of the plurality of the third support pillars 170 can be the same. In other embodiments of the invention, the height H1 of the plurality of the first support pillars 140 and the height H3 of the plurality of the third support pillars 170 can be different.

In addition, two or more of the liquid crystal cells in the embodiments of the invention as mentioned previously can be bonded together to form a stacked structure. For example, one liquid crystal cell 100b can be bonded to another liquid crystal cell 100b, one liquid crystal cell 100c, two liquid crystal cells 100c, or one liquid crystal cell 100c and one liquid crystal cell 100d, but the invention is not limited thereto. In some embodiments, the plurality of the second support pillars 150 disposed on the fourth surface 124 of the second substrate 120, the plurality of the second support pillars 160 disposed on the second surface 114 of the first substrate 110, or the plurality of the third support pillars 170 disposed on the fourth surface 124 of the second substrate 120 can be bonded to another liquid crystal cell or a single substrate and can be used as spacers for another liquid crystal cell. Namely, two liquid crystal cells can share the same first substrate 110 or second substrate 120, which can reduce the total thickness of the stacked structure.

FIG. 8A to FIG. 8D are cross-sectional views illustrating a manufacturing process for a liquid crystal cell according to an embodiment of the invention.

Referring to FIG. 8A, a first substrate 110 having a first surface 112 and a second surface 114 opposite to the first surface 112 and a second substrate 120 having a third surface 122 and a fourth surface 124 opposite to the third surface 122 are provided. The materials of the first substrate 110 and second substrate 120 may include glass, polyimide (PI), polystyrene (PS), polypropylene (PP), or silicon, for example. The step as illustrated in FIG. 8A is a first step of the following embodiments, so it will not be repeated hereinafter.

Then, referring to FIG. 8B, the first substrate 110 and the second substrate 120 are thinned to reduce the total thickness of the liquid crystal cell. A method of thinning the first substrate 110 and the second substrate 120 is, for example, a chemical etching process.

Figure 8D:
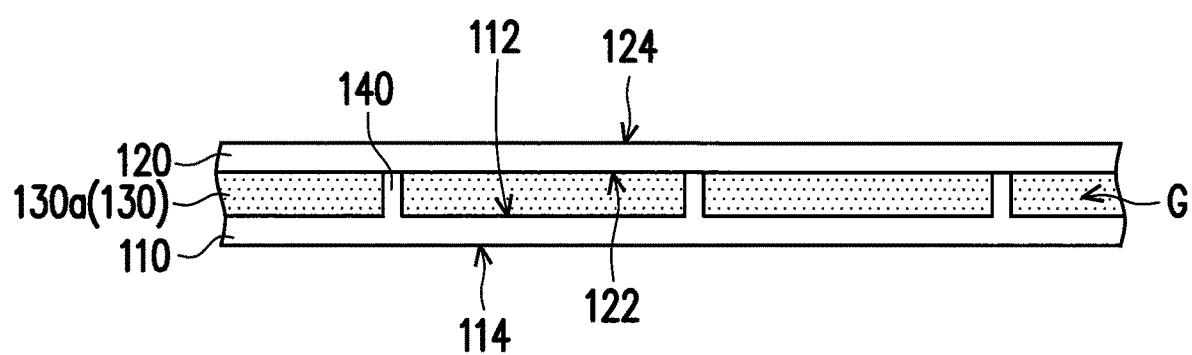

Next, referring to FIG. 8C, the first surface 112 of the first substrate 110 is etched to form a plurality of first support pillars 140. Then, referring to FIG. 8D, liquid crystals 130a are filled into a gap G between the first substrate 110 and the second substrate 120 to form a liquid crystal layer 130. The first substrate 110 and the second substrate 120 are bonded together and the first surface 112 of the first substrate 110 and the third surface 122 of the second substrate 120 face each other. Accordingly, by etching the first substrate 110, the plurality of first support pillars 140 with larger height are easily formed as the spacers of the liquid crystal cell. Besides, a patterning method for forming the plurality of first support pillars 140 includes a lithography process, which offers an ability to precisely control the size of the plurality of first support pillars 140. Hence, the liquid crystal cell of the embodiment of the invention is capable of achieving uniform cell gap.

In the present embodiment, a method for binding the first substrate 110 and the second substrate 120 includes using optical clear adhesive (OCA) or optical clear resin (OCR). A method for filling liquid crystals 130a into a gap G between the first substrate 110 and the second substrate 120 includes one drop filling (ODF).

In the present embodiment, the first substrate 110 and second substrate 120 are thinned before the first surface 112 of the first substrate 110 is etched to form the plurality of first support pillars 140. In other embodiments (not illustrated), the first substrate 110 and the second substrate 120 can be thinned after bonding the first substrate 110 and the second substrate 120. Beside, only the first substrate 110 may be thinned and the second substrate 120 may be not thinned, or only the second substrate 120 may be thinned and the first substrate 110 may be not thinned, or both the first substrate 110 and the second substrate 120 may be not thinned. Specially, during the etching process for forming the plurality of first support pillars 140, surface defects (such as scratches) of the first substrate 110 may be formed. If the first substrate 110 is thinned before etching the first substrate 110 to form a plurality of first support pillars 140, it can prevent the surface defects from becoming serious after the thinning process.

In the present embodiment, a height H1 of the plurality of first support pillars 140 ranges from 2 μm to 50 μm. For the liquid crystal display, the height H1 of the plurality of first support pillars 140 may range from 2 μm to 5 μm, for example. For the liquid crystal lens, the height H1 of the plurality of first support pillars 140 may range from 10 μm to 50 μm, for example. For the liquid crystal filter, the height H1 of the plurality of first support pillars 140 may range from 3 μm to 5 μm, for example.

FIG. 9A to FIG. 9E are cross-sectional views illustrating manufacturing processes for a liquid crystal cell according to other embodiments of the invention.

Figure 9C:
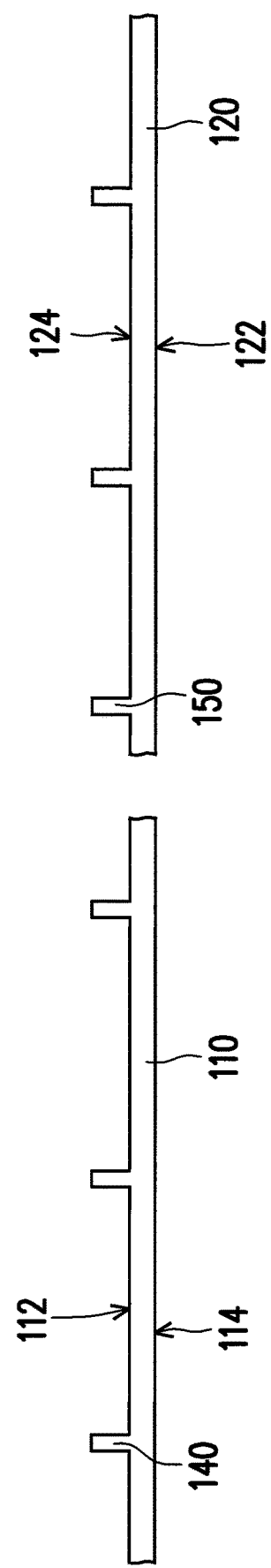

Referring to FIG. 9A, the first substrate 110 and the second substrate 120 are thinned to reduce the total thickness of the liquid crystal cell. Then, referring to FIG. 9B and FIG. 9C, the first surface 112 of the first substrate 110 is etched to form a plurality of first support pillars 140 and one of the third surface 122 and the fourth surface 124 of the second substrate 120 is etched to form a plurality of second support pillars 150. The first condition is that the plurality of second support pillars 150 are formed on the third surface 122 of the second substrate 120, as illustrated in FIG. 9B. The second condition is that the plurality of second support pillars 150 are formed on the fourth surface 124 of the second substrate 120, as illustrated in FIG. 9C.

Figure 9D:
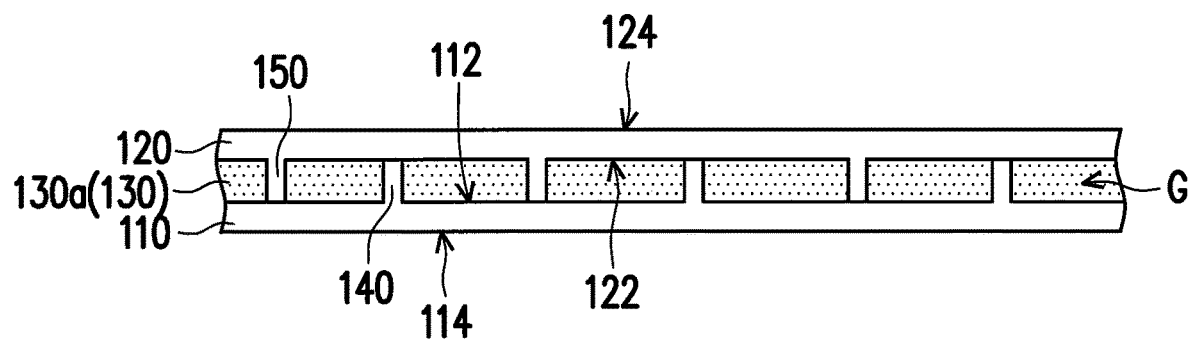
Figure 9E:
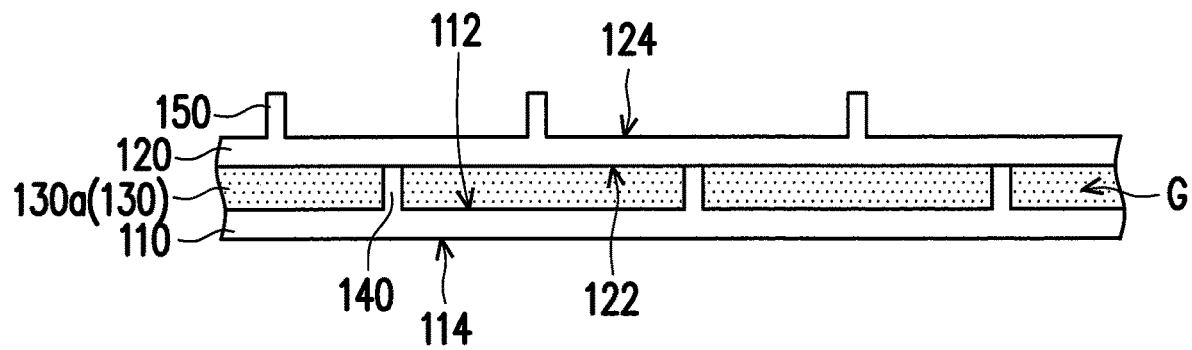

The steps illustrated in FIG. 9D and FIG. 9E are the following steps of ones illustrated in FIG. 9B and FIG. 9C, respectively. Next, referring to FIG. 9D and FIG. 9E, liquid crystals 130a are filled into a gap G between the first substrate 110 and the second substrate 120 to form a liquid crystal layer 130. The first substrate 110 and the second substrate 120 are bonded together and the first surface 112 of the first substrate 110 and the third surface 122 of the second substrate 120 face each other.

In the present embodiments, fourth surface 124 of the second substrate 120 is etched to form a plurality of second support pillars 150 before bonding the first substrate 110 and the second substrate 120. In other embodiments (not illustrated), the fourth surface 124 of the second substrate 120 may be etched to form a plurality of second support pillars 150 after bonding the first substrate 110 and the second substrate 120.

In the present embodiments, the first substrate 110 and the second substrate 120 are thinned before the first surface 112 of the first substrate 110 is etched to form the plurality of first support pillars 140 and one of the third surface 122 and the fourth surface 124 of the second substrate 120 is etched to form a plurality of second support pillars 150. In other embodiments (not illustrated), the first substrate 110 can be thinned after bonding the first substrate 110 and the second substrate 120. If the fourth surface 124 of the second substrate 120 is not etched to form the plurality of second support pillars 150, the second substrate 120 can be thinned after bonding the first substrate 110 and the second substrate 120. If the fourth surface 124 of the second substrate 120 is etched to form the plurality of second support pillars 150 after bonding the first substrate 110 and the second substrate 120, the second substrate 120 can be thinned after bonding the first substrate 110 and the second substrate 120, and before etching the fourth surface 124 of the second substrate 120 to form the plurality of second support pillars 150. Beside, only the first substrate 110 may be thinned and the second substrate 120 may be not thinned, or only the second substrate 120 may be thinned and the first substrate 110 may be not thinned, or both the first substrate 110 and the second substrate 120 may be not thinned.

Figure 10A:
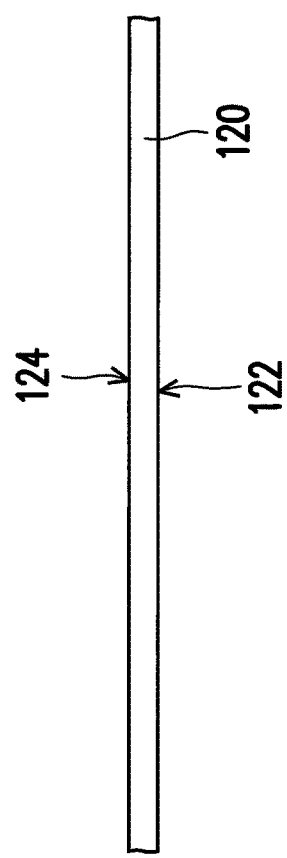
FIG. 10A to FIG. 10C are cross-sectional views illustrating a manufacturing process for a liquid crystal cell according to another embodiments of the invention.
Figure 10B:
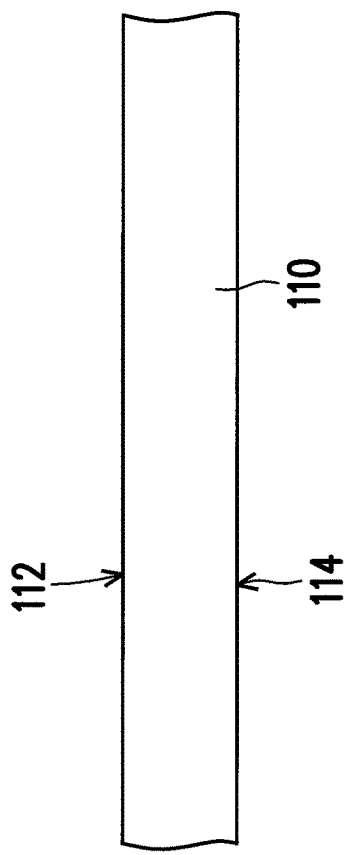
Figure 10B:
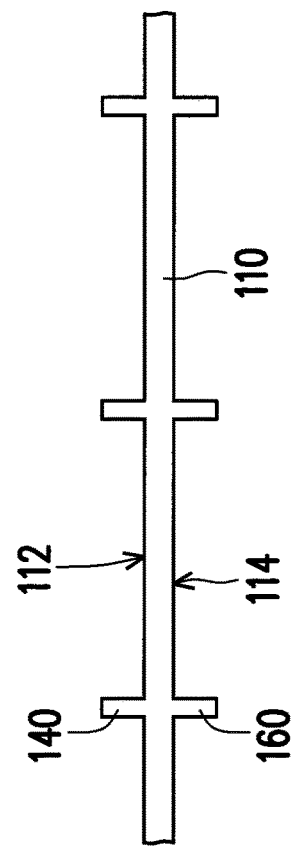
Figure 10C:
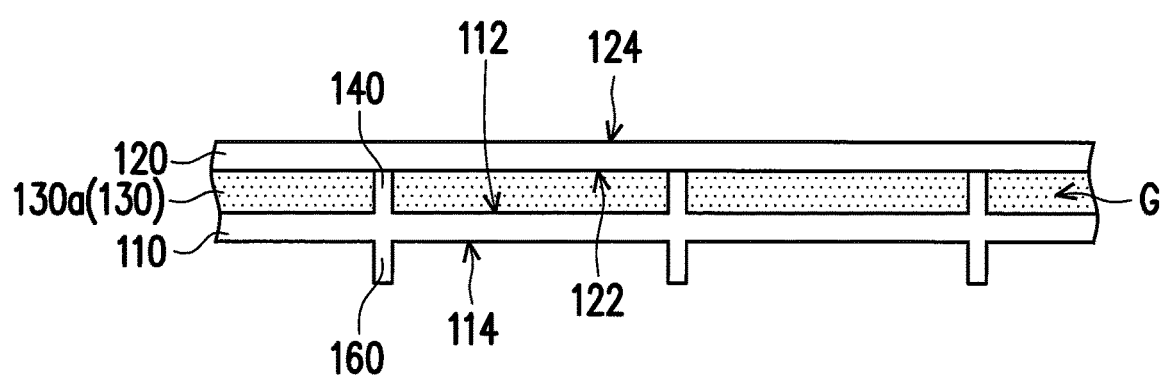

FIG. 10A to FIG. 10C are cross-sectional views illustrating a manufacturing process for a liquid crystal cell according to another embodiments of the invention.

Referring to FIG. 10A, the first substrate 110 and the second substrate 120 are thinned to reduce the total thickness of the liquid crystal cell. Then, referring to FIG. 10B, the first surface 112 of the first substrate 110 is etched to form a plurality of first support pillars 140 and the second surface 114 of the first substrate 110 is etched to form a plurality of second support pillars 160.

Next, referring to FIG. 10C, liquid crystals 130a are filled into a gap G between the first substrate 110 and the second substrate 120 to form a liquid crystal layer 130. The first substrate 110 and the second substrate 120 are bonded together and the first surface 112 of the first substrate 110 and the third surface 122 of the second substrate 120 face each other.

In the present embodiment, the second surface 114 of the first substrate 110 is etched to form a plurality of second support pillars 160 before bonding the first substrate 110 and the second substrate 120. In other embodiments (not illustrated), the second surface 114 of the first substrate 110 may be etched to form a plurality of second support pillars 160 after bonding the first substrate 110 and the second substrate 120.

In the present embodiments, the first substrate 110 and the second substrate 120 are thinned before the first surface 112 of the first substrate 110 is etched to form a plurality of first support pillars 140 and the second surface 114 of the first substrate 110 is etched to form a plurality of second support pillars 160. In other embodiments (not illustrated), the second substrate 120 can be thinned after bonding the first substrate 110 and the second substrate 120. If the second surface 114 of the first substrate 110 is etched to form a plurality of second support pillars 160 after bonding the first substrate 110 and the second substrate 120, the first substrate 110 can be thinned after bonding the first substrate 110 and the second substrate 120, and before etching the second surface 114 of the first substrate 110 to form a plurality of second support pillars 160. Beside, only the first substrate 110 may be thinned and the second substrate 120 may be not thinned, or only the second substrate 120 may be thinned and the first substrate 110 may be not thinned, or both the first substrate 110 and the second substrate 120 may be not thinned.

FIG. 11A to FIG. 11E are cross-sectional views illustrating manufacturing processes for a liquid crystal cell according to other embodiments of the invention.

Figure 11A:
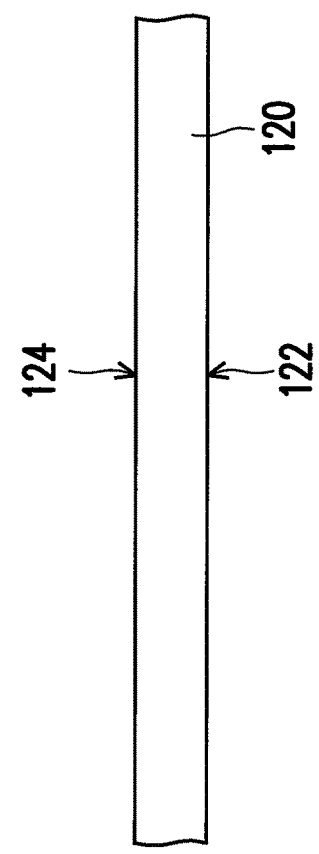
FIG. 11A to FIG. 11E are cross-sectional views illustrating manufacturing processes for a liquid crystal cell according to other embodiments of the invention.
Figure 11B:
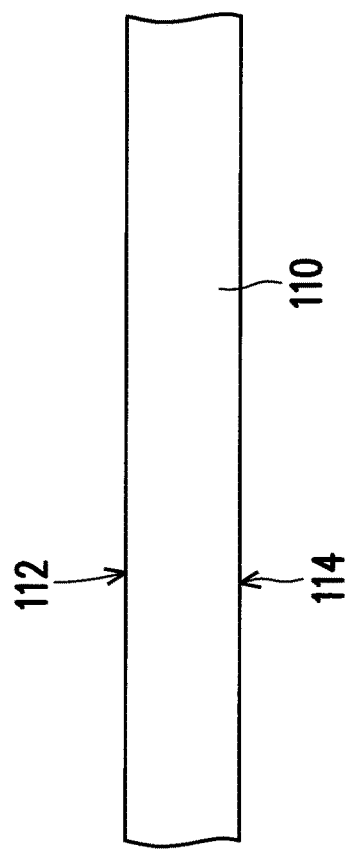

Referring to FIG. 11A, the first substrate 110 and the second substrate 120 are thinned to reduce the total thickness of the liquid crystal cell. Then, referring to FIG. 11B and FIG. 11C, the first surface 112 and the second surface 114 of the first substrate 110 are etched to form a plurality of first support pillars 140 and a plurality of second support pillars 160, respectively, and one of the third surface 122 and the fourth surface 124 of the second substrate 120 is etched to form a plurality of third support pillars 170. The first condition is that the plurality of third support pillars 170 are formed on the third surface 122 of the second substrate 120, as illustrated in FIG. 11B. The second condition is that the plurality of third support pillars 170 are formed on the fourth surface 124 of the second substrate 120, as illustrated in FIG. 11C.

Figure 11C:
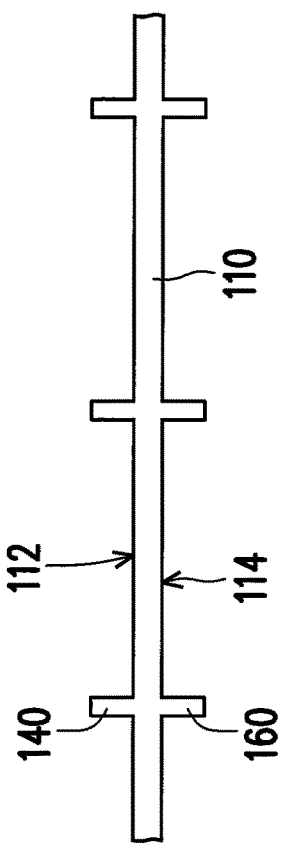
Figure 11D:
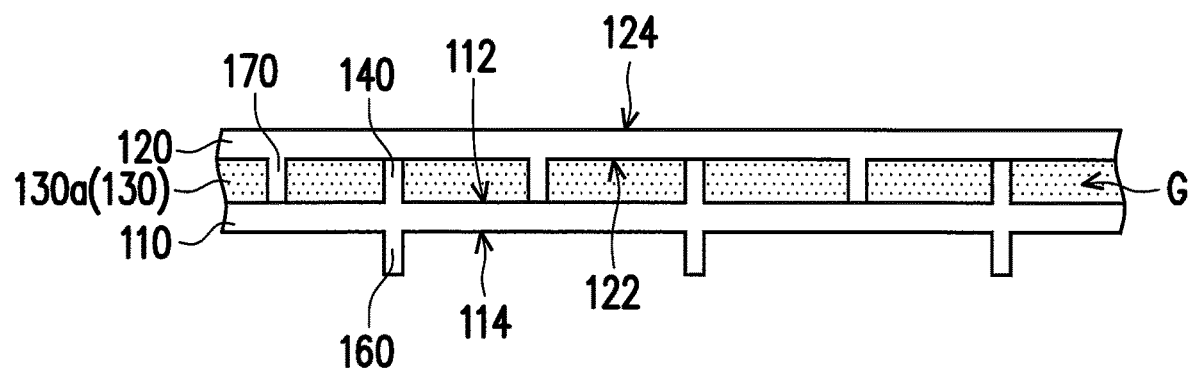
Figure 11E:
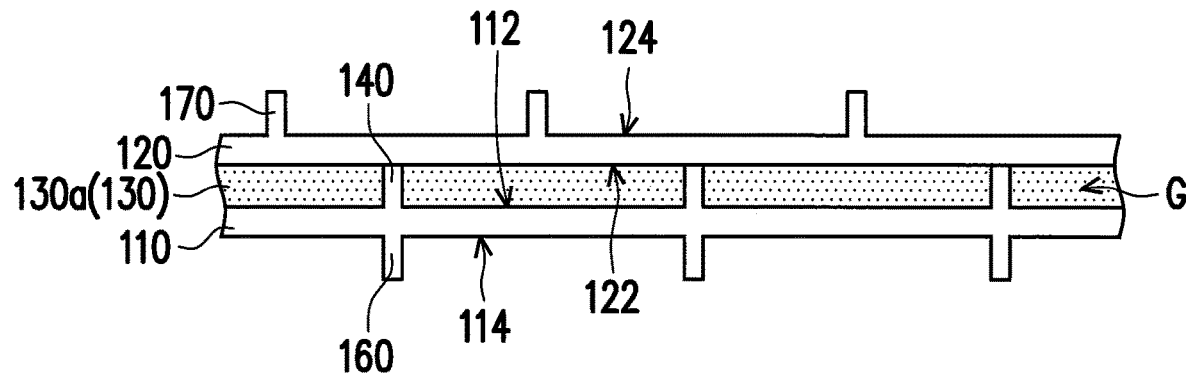

The steps illustrated in FIG. 11D and FIG. 11E are the following steps of ones illustrated in FIG. 11B and FIG. 11C, respectively. Next, referring to FIG. 11D and FIG. 11E, liquid crystals 130a are filled into a gap G between the first substrate 110 and the second substrate 120 to form a liquid crystal layer 130. The first substrate 110 and the second substrate 120 are bonded together and the first surface 112 of the first substrate 110 and the third surface 122 of the second substrate 120 face each other.

In the present embodiments, the second surface 114 of the first substrate 110 is etched to form a plurality of second support pillars 160 and the fourth surface 124 of the second substrate 120 is etched to form a plurality of third support pillars 170 before bonding the first substrate 110 and the second substrate 120. In other embodiments (not illustrated), the second surface 114 of the first substrate 110 mat be etched to form a plurality of second support pillars 160 and the fourth surface 124 of the second substrate 120 may be etched to form a plurality of third support pillars 170 after bonding the first substrate 110 and the second substrate 120.

In the present embodiments, the first substrate 110 and the second substrate 120 are thinned before the first surface 112 of the first substrate 110 is etched to form the plurality of first support pillars 140 and one of the third surface 122 and the fourth surface 124 of the second substrate 120 is etched to form a plurality of third support pillars 170. In other embodiments (not illustrated), if the second surface 114 of the first substrate 110 is etched to form the plurality of second support pillars 160 after bonding the first substrate 110 and the second substrate 120, the first substrate 110 can be thinned after bonding the first substrate 110 and the second substrate 120 and before the second surface 114 of the first substrate 110 is etched to form the plurality of second support pillars 160. If the fourth surface 124 of the second substrate 120 is not etched to form a plurality of third support pillars 170, the second substrate 120 can be thinned after bonding the first substrate 110 and the second substrate 120. If the fourth surface 124 of the second substrate 120 is etched to form the plurality of third support pillars 170 after bonding the first substrate 110 and the second substrate 120, the second substrate 120 can be thinned after bonding the first substrate 110 and the second substrate 120 and before etching the fourth surface 124 of the second substrate 120 to form the plurality of third support pillars 170. Beside, only the first substrate 110 may be thinned and the second substrate 120 may be not thinned, or only the second substrate 120 may be thinned and the first substrate 110 may be not thinned, or both the first substrate 110 and the second substrate 120 may be not thinned.

Figure 12A:
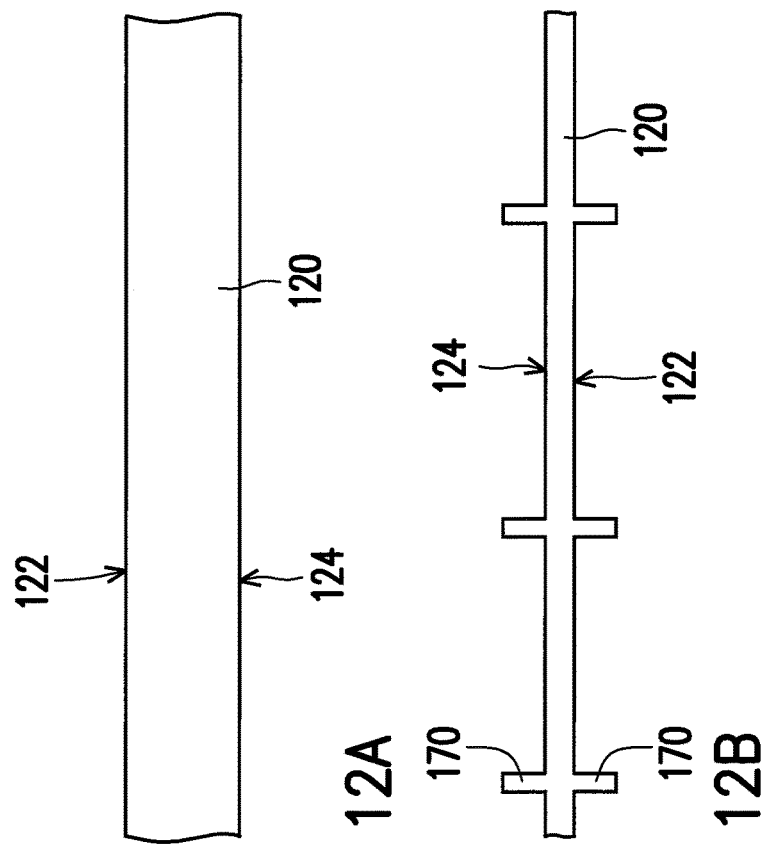
FIG. 12A to FIG. 12C are cross-sectional views illustrating a manufacturing process for a liquid crystal cell according to another embodiment of the invention.
Figure 12B:
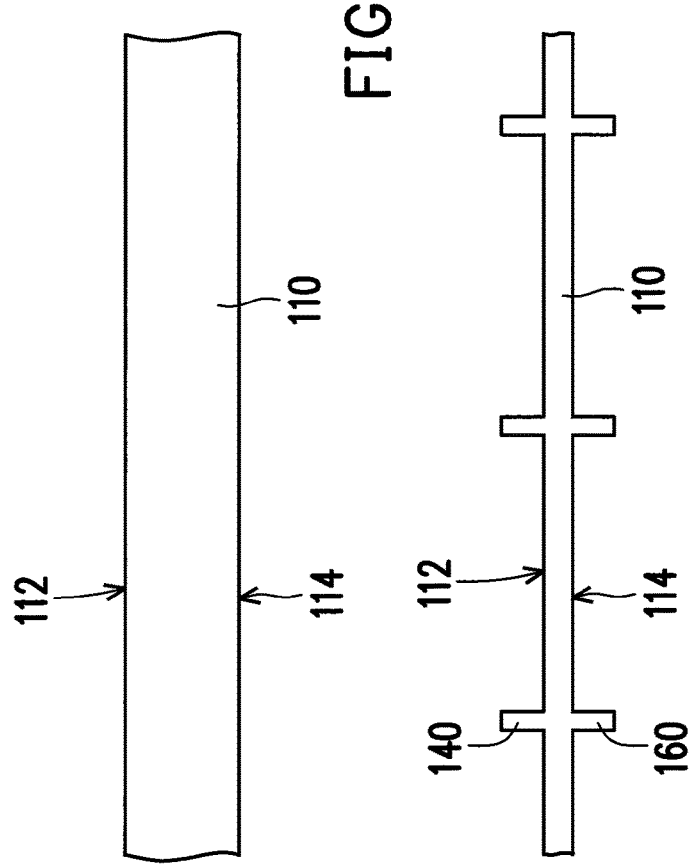
Figure 12C:
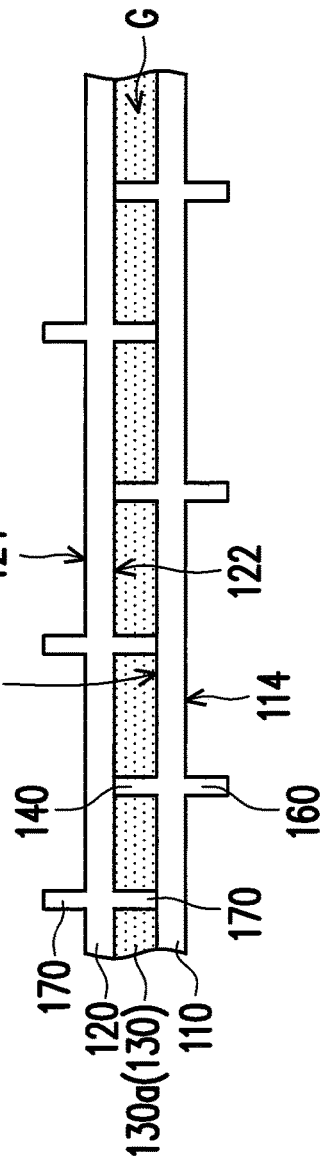

FIG. 12A to FIG. 12C are cross-sectional views illustrating a manufacturing process for a liquid crystal cell according to another embodiment of the invention.

Referring to FIG. 12A, the first substrate 110 and the second substrate 120 are thinned to reduce the total thickness of the liquid crystal cell. Then, referring to FIG. 12B, the first surface 112 and the second surface 114 of the first substrate 110 are etched to form a plurality of first support pillars 140 and a plurality of second support pillars 160, respectively, and both of the third surface 122 and the fourth surface 124 of the second substrate 120 are etched to form a plurality of third support pillars 170.

Next, referring to FIG. 12C, liquid crystals 130a are filled into a gap G between the first substrate 110 and the second substrate 120 to form a liquid crystal layer 130. The first substrate 110 and the second substrate 120 are bonded together and the first surface 112 of the first substrate 110 and the third surface 122 of the second substrate 120 face each other.

In the present embodiments, the second surface 114 of the first substrate 110 is etched to form a plurality of second support pillars 160 and the fourth surface 124 of the second substrate 120 is etched to form the plurality of third support pillars 170 before bonding the first substrate 110 and the second substrate 120. In other embodiments (not illustrated), the second surface 114 of the first substrate 110 is etched to form a plurality of second support pillars 160 and the fourth surface 124 of the second substrate 120 is etched to form the plurality of third support pillars 170 after bonding the first substrate 110 and the second substrate 120.

In the present embodiments, the first substrate 110 and the second substrate 120 are thinned before the first surface 112 of the first substrate 110 is etched to form a plurality of first support pillars 140 and the third surface 122 of the second substrate 120 is etched to form a plurality of third support pillars 170. In other embodiments (not illustrated), if the second surface 114 of the first substrate 110 is etched to form a plurality of second support pillars 160 and the fourth surface 124 of the second substrate 120 is etched to form the plurality of third support pillars 170 after bonding the first substrate 110 and the second substrate 120, the first substrate 110 and the second substrate 120 can be thinned after bonding the first substrate 110 and the second substrate 120 and before etching the second surface 114 of the first substrate 110 and the fourth surface 124 of the second substrate 120 to form the plurality of second support pillars 160 and the plurality of third support pillars 170, respectively. Beside, only the first substrate 110 may be thinned and the second substrate 120 may be not thinned, or only the second substrate 120 may be thinned and the first substrate 110 may be not thinned, or both the first substrate 110 and the second substrate 120 may be not thinned.

To sum up, the advantageous effects of the liquid crystal cells in the embodiments of the invention include the following. By etching the first substrate, the plurality of first support pillars with larger height are easily formed as the spacers of the liquid crystal cell. Since the plurality of first support pillars and the first substrate are integrally formed and made of the same material, the plurality of first support pillars are firm enough to resist the following high-temperature processes or external force applied and have relatively minor influences on the optical performance. In addition, the problems of insufficient adhesive strength between two materials, inadequate supporting strength of the spacers, and pollution of the liquid crystals due to contact with the spacers can be solved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A liquid crystal lens, comprising:
a first substrate, having a first surface and a second surface opposite to the first surface;
a second substrate disposed beside the first substrate and having a third surface and a fourth surface opposite to the third surface, wherein the first surface of the first substrate and the third surface of the second substrate face each other;
a liquid crystal layer, disposed between the first substrate and the second substrate;
a plurality of first support pillars configured to form a cell gap of the liquid crystal lens , disposed on the first surface of the first substrate, wherein a height of the plurality of first support pillars ranges from more than 20 μm to 50 μm and the first substrate and the plurality of first support pillars are integrally formed and made of a same first material;
a plurality of second support pillars, disposed on the second surface of the first substrate, wherein the first substrate and the plurality of second support pillars are integrally formed and made of the same first material;
a plurality of third support pillars, disposed on at least one of the third surface and the fourth surface of the second substrate, wherein the second substrate and the plurality of third support pillars are integrally formed and made of a same second material;
a first electrode layer disposed on the first surface of the first substrate; and
a second electrode layer disposed on the third surface of the second substrate, wherein the first electrode layer is disposed between the first substrate and the second electrode layer.

2. The liquid crystal lens according to claim 1, wherein heights of the plurality of the first support pillars and the plurality of the third support pillars are the same.

3. The liquid crystal lens according to claim 1, wherein the first material of the first substrate is glass, polyimide (PI), polystyrene (PS), polypropylene (PP), or silicon.

4. The liquid crystal lens according to claim 1, wherein heights of the plurality of the first support pillars and the plurality of the third support pillars are different.

5. A liquid crystal lens, comprising:
a first substrate, having a first surface and a second surface opposite to the first surface;
a second substrate disposed beside the first substrate and having a third surface and a fourth surface opposite to the third surface, wherein the first surface of the first substrate and the third surface of the second substrate face each other;
a liquid crystal layer, disposed between the first substrate and the second substrate;
a plurality of first support pillars configured to form a cell gap of the liquid crystal lens , disposed on the first surface of the first substrate, wherein a height of the plurality of first support pillars ranges from more than 20 μm to 50 μm and the first substrate and the plurality of first support pillars are integrally formed and made of a same first material;
a plurality of second support pillars, disposed on the fourth surface of the second substrate, wherein the second substrate and the plurality of second support pillars are integrally formed and made of a same second material, and the height of the plurality of the first support pillars and a height of the plurality of the second support pillars are different;
a first electrode layer disposed on the first surface of the first substrate; and
a second electrode layer disposed on the third surface of the second substrate, wherein the second electrode layer is disposed between the second substrate and the first electrode layer.

* * * * *